US011276010B2

(12) United States Patent
Venkataraman et al.

(10) Patent No.: US 11,276,010 B2
(45) Date of Patent: Mar. 15, 2022

(54) METHOD AND SYSTEM FOR EXTRACTING RELEVANT ENTITIES FROM A TEXT CORPUS

(71) Applicant: Wipro Limited, Bangalore (IN)

(72) Inventors: Arthi Venkataraman, Bangalore (IN); Ajay Anantha, Bangalore (IN); Kanika Singla, Fatehgarh Sahit (IN); Rahul Garg, Morena (IN)

(73) Assignee: Wipro Limited, Bangalore (IN)

( * ) Notice: Subject to any disclaimer, the term of this patent is extended or adjusted under 35 U.S.C. 154(b) by 1076 days.

(21) Appl. No.: 15/463,901

(22) Filed: Mar. 20, 2017

(65) Prior Publication Data

US 2018/0253663 A1 Sep. 6, 2018

(30) Foreign Application Priority Data

Mar. 6, 2017 (IN) ............................ 201741007846

(51) Int. Cl.
*G06N 20/00* (2019.01)
*G06F 16/93* (2019.01)
*G06F 16/33* (2019.01)
*G06F 16/31* (2019.01)
*G06F 40/205* (2020.01)

(52) U.S. Cl.
CPC .......... *G06N 20/00* (2019.01); *G06F 16/313* (2019.01); *G06F 16/334* (2019.01); *G06F 16/93* (2019.01); *G06F 40/205* (2020.01)

(58) Field of Classification Search
CPC ..................................................... G06N 20/00
See application file for complete search history.

(56) References Cited

U.S. PATENT DOCUMENTS 5,706,497 A * 1/1998 Takahashi ............ G06F 16/334
6,006,221 A * 12/1999 Liddy ................ G06F 16/3337
6,842,751 B1 * 1/2005 Vilalta
8,594,996 B2 11/2013 Long et al.
9,158,754 B2 10/2015 Whitman et al.
9,183,535 B2 11/2015 Eustice et al.
2003/0078899 A1 * 4/2003 Shanahan ............ G06F 16/353 706/8
2010/0145678 A1 * 6/2010 Csomai ................ G06F 40/268 704/9

(Continued)

*Primary Examiner* — Omar F Fernandez Rivas
*Assistant Examiner* — Selene A. Haedi
(74) *Attorney, Agent, or Firm* — Finnegan, Henderson, Farabow, Garrett & Dunner, LLP

(57) ABSTRACT

The present disclosure discloses method and system for extracting relevant entities from a text corpus. The method comprises receiving, by the entity extraction computing device, a text corpus and an entity, determining at least one feature for each block of text from the text corpus, where the at least one feature corresponds to predefined one or more feature heads, calculating a score for each block of text from the text corpus based on training of the entity extraction system, determining a template from one or more templates based on the score, where the one or more templates are generated based on the training of the entity extraction system, and extracting at least one relevant entity from the text corpus, with respect to the entity, based on the template. The method and system disclosed in the present disclosure may be used to extract relevant entities across various domains by training the system.

21 Claims, 5 Drawing Sheets

ENTITY EXTRACTION SYSTEM 100
I/O INTERFACE 201
MEMORY 202
PROCESSOR 203
DATA 204
FEATURE DATA 205
FEATURE HEAD DATA 206
TRAINING DATA 207
TEMPLATE DATA 208
OTHER DATA 209
MODULES 210
FEATURE DETERMINATION MODULE 211
SCORE CALCULATOR 212
PATTERN GENERATION MODULE 213
TEMPLATE DETERMINATION MODULE 214
EXTRACTION MODULE 215
OTHER MODULES 216

(56) References Cited

U.S. PATENT DOCUMENTS

| | | | | |
|---|---|---|---|---|
| 2014/0082003 | A1 | 3/2014 | Feldman et al. | |
| 2014/0122057 | A1* | 5/2014 | Chelba | G06F 3/0418 704/9 |
| 2016/0170952 | A1* | 6/2016 | Carrier | G06F 40/174 704/9 |
| 2017/0300632 | A1* | 10/2017 | Bai | G06F 40/279 |
| 2018/0150522 | A1* | 5/2018 | Moskwinski | G06F 16/90335 |

* cited by examiner

METHOD AND SYSTEM FOR EXTRACTING RELEVANT ENTITIES FROM A TEXT CORPUS

This application claims the benefit of Indian Patent Application Serial No. 201741007846, filed Mar. 6, 2017, which is hereby incorporated by reference in its entirety.

TECHNICAL FIELD

The present disclosure relates to data extraction. Specifically, but not exclusively, the present disclosure relates to method and system for extracting relevant entities from an unstructured text corpus.

BACKGROUND

Data extraction is a process of extracting text from an unstructured text corpus. Very often, certain text has to be extracted from the unstructured text corpus for data analysis. Also, there exists a need to extract relevant text with respect to a given text for data analysis. The text or a group of text is extracted from text corpus by existing systems by employing custom methods to extract specific text from the text corpus. However, this process is very tedious and lacks flexibility to extract text not defined in the system.

Traditional text extraction systems are domain specific, i.e., the extraction systems are configured to extract text for a specific domain. Thus, the traditional systems cannot be used for extracting text across domains. Also, the traditional systems rely highly on training models with large set of supervised data. The large set of supervised data consumes a large amount of memory and training for the large set of data incurs additional cost and resources.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method of extracting relevant entities from a text corpus. The method comprises receiving, by an entity extraction system, a text corpus and an entity, determining at least one feature for each block of text from the text corpus, where the at least one feature corresponds to predefined one or more feature heads, calculating a score for each block of text from the text corpus based on training of the entity extraction system, determining a template from one or more templates based on the score, and extracting at least one relative entity from the text corpus, with respect to the entity, based on the template.

In an embodiment, the present disclosure relates to an entity extraction system for extracting relevant entities from a text corpus. The entity extraction system comprises a processor and a memory. The processor is configured to receive a text corpus and an entity, determine at least one feature for each block of text from the text corpus, where the at least one feature corresponds to predefined one or more feature heads, calculate a score for each block of text from the text corpus based on training of the entity extraction system, determine a template from one or more templates based on the score, and extract at least one relative entity from the text corpus, with respect to the entity, based on the template.

In an embodiment, the present disclosure relates to a non-transitory computer readable medium including instructions stored thereon that when processed by at least one processor cause a device to perform operations comprising, receiving a text corpus and an entity, determining at least one feature for each block of text from the text corpus, wherein the at least one feature corresponds to predefined one or more feature heads, calculating a score for each block of text from the text corpus based on training of the entity extraction system, determining a template from one or more templates based on the score, and extracting at least one relative entity from the text corpus, with respect to the entity, based on the template.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
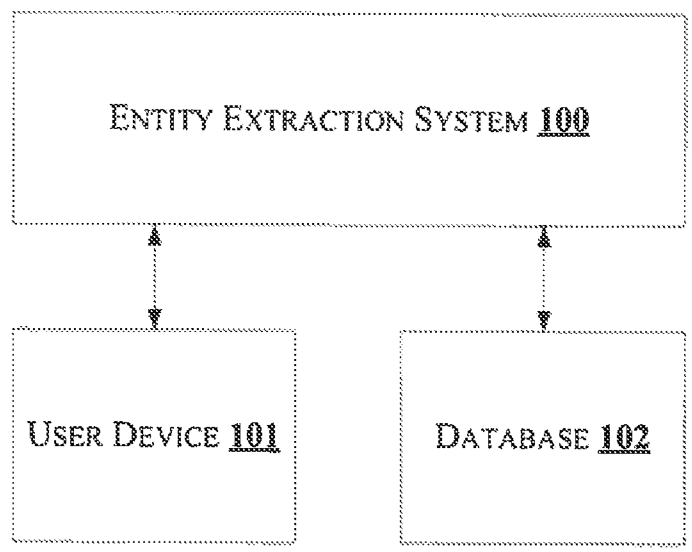
FIG. 1 illustrates an architecture diagram of an entity extraction system for extracting relevant entities from a text corpus in accordance with embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word “exemplary” is used herein to mean “serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a method and a system for extracting relevant entities from a text corpus in accordance with embodiments of the present disclosure. The method comprises receiving a text corpus and an entity for which relevant entities has to be extracted. The method further comprises determining features of each block of text from the text corpus, determine a score for each block of text from the text corpus and extract relevant entities with respect to the entity from the text corpus, based on the score. The method and system disclosed in the present disclosure may be used to extract relevant entities across various domains by training the system.

FIG. 1 shows an architecture diagram of an entity extracting system 100 for extracting relevant entities from a text corpus. The entity extraction system 100 may be associated with the user device 101 and a database 102. In an embodiment, the user device 101 and the database 102 may be connected to the entity extraction system 100 through a network (not shown in figure). The entity extraction system 100 receives a text corpus and an entity for which relevant entities has to be extracted, from the user device 101. The entity extraction system 100 then extracts at least one relevant entity from the text corpus and may store the at least one relevant entity in the database 102. In an embodiment, the entity extraction system 100 may provide the at least one relevant entity to a user through the user device 101. Further, the entity extraction system 100 may receive a feedback for the at least one relevant entity provided to the user.

In an embodiment, the text corpus may be provided as a text document, characters from a document, or any other means of conveying a text corpus. In an embodiment, the entity may be a character, a word, a phrase or a sentence.

Figure 2:
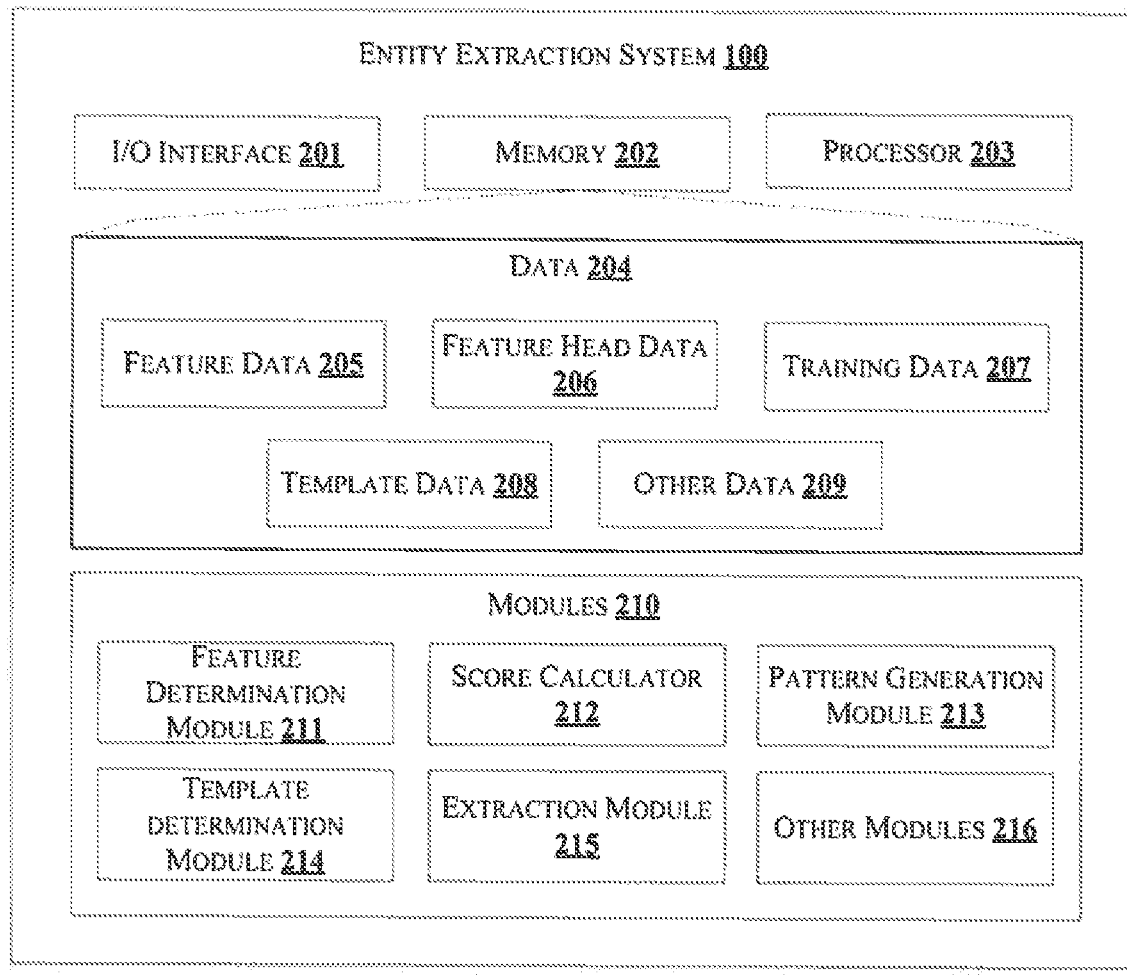
FIG. 2 illustrates an internal architecture of an entity extraction system for extracting relevant entities from a text corpus in accordance with embodiments of the present disclosure.

FIG. 2 illustrates internal architecture of the entity extraction system 100 in accordance with some embodiments of the present disclosure. The extraction system 100 may include at least one Central Processing Unit ("CPU" or "processor") 203 and a memory 202 storing instructions executable by the at least one processor 203. The processor 203 may comprise at least one data processor for executing program components for executing user or system-generated requests. The memory 202 is communicatively coupled to the processor 203. The extraction system 100 further comprises an Input/Output (I/O) interface 201. The I/O interface 201 is coupled with the processor 203 through which an input signal or/and an output signal is communicated.

In an embodiment, data 204 may be stored within the memory 202. The data 204 may include, for example, feature data 205, feature head data 206, training data 207, template data 208 and other data 209.

In an embodiment, the feature data 205 may include, but is not limited to noun, adjective, adverb, verb, and preposition, direct object, noun compound modifier, nominal subject, attribute, adjectival modifier, object of a preposition, root, argument structure, temporal, location, negation, moral, noun phrase, prepositional phrase, adverb phrase and adjective phrase. The feature data 205 may be with respect to each block of text from the text corpus.

In an embodiment, the feature head data 206 may include, but is not limited to, Parts of Speech (POS) tagging, semantic role labelling, a syntax tree and dependency parsing. The feature head data 206 may be with respect to the feature data 205.

In an embodiment, the training data 207 may include, but is not limited to, weights associated with the feature data 206 and the feature head data 207, and a plurality of patterns of correlation between each block of text of the text corpus and the entity.

In an embodiment, the template data 208 may include, but is not limited to, identical patterns among the plurality of patterns indicating correlation between the entity and each block of text from the text corpus.

In an embodiment, the data 204 in the memory 202 is processed by modules 210 of the entity extraction system 100. As used herein, the term modules refers to an application specific integrated circuit (ASIC), an electronic circuit, a field-programmable gate arrays (FPGA), Programmable System-on-Chip (PSoC), a combinational logic circuit, and/or other suitable components that provide the described functionality. The modules 210 when configured with the functionality defined in the present disclosure will result in a novel hardware.

In one implementation, the modules 210 may include, for example, a feature determination module 211, a score calculator 212, a pattern generation module 213, a template determination module 214, an extraction module 215 and other modules 216. It will be appreciated that such aforementioned modules 210 may be represented as a single module or a combination of different modules.

The processor 203 may receive the text corpus and the entity from the user device 101. In an embodiment, the feature determination module 211 may receive the text corpus from the processor 203. Further, the feature determination module 211 determines at least one feature for each block of text from the text corpus. Here, the at least one feature corresponds to predefined one or more feature heads. The feature determination module 211 may map the at least one feature with corresponding predefined one or more feature heads. The at least one feature may include the feature data 206, and the predefined one or more feature heads may include the feature head data 207. In an embodiment, the feature determination module 211 may employ Natural Language Processing (NLP) technique to determine the at least one feature. The feature determination module 211 may employ other computational linguistic methods to determine the at least one feature from the text corpus.

In an embodiment, the score calculator 212 receives the at least one feature and the predefined one or more feature heads from the feature determination module 211. Further, the score calculator 212 assigns weights to the at least one feature and the predefined one or more feature heads. Further, the score calculator 212 calculates a score for each block of text from the text corpus based on the weights assigned to the at least one feature and the predefined one or more feature heads. In an embodiment, a score may be calculated for every character of a text.

In an embodiment, the pattern generation module 213 generates a plurality of patterns of correlation between each block of text of the text corpus and the entity. Here, the plurality of patterns may be combination of the at least one feature and the predefined one or more feature heads. Further, each pattern may be provided a score based on the weights assigned to the at least one feature and the predefined one or more feature heads.

In an embodiment, the template determination module 214 receives the plurality of patterns from the pattern generation module 213 and determines one or more templates by identifying identical patterns from the plurality of patterns. Further, the one or more templates may be associated with a predefined threshold score. When a character of a text of a particular pattern has a score less than the predefined threshold score, then the character may be eliminated and remaining characters may be considered as a new pattern. Further, when the new pattern has identical patterns among the plurality of patterns, then the new pattern may be considered as a template. In an embodiment, the one or more templates may be generated based on a fuzzy logic. In an embodiment, the template determination module 214 compresses the identical patterns and eliminates a text or character having a score less than the predefined threshold score.

In an embodiment, the extraction module 215 extracts at least one relevant entity from the text corpus based on the one or more templates. The at least one relevant entity may be a part of the one or more templates. In an embodiment, order in which the at least one entity is extracted may depend on the score associated with each block of text present in the one or more templates. For example, a text having a higher score may be extracted first, and a text having a relatively lower score is extracted consequently.

In an embodiment, the other modules 209 may include, but is not limited to user interface module, notification module and the like. The user interface module may be used to receive feedback from the user for the relevant entities provided to the user. For example, consider a scenario where a text corpus is provided to the entity extraction system 100. Further, consider that an entity is provided to the entity extraction system 100 for which relevant entities are to be extracted. Let us consider that there are 55 relevant entities in the text corpus, but the entity extraction system 100 has extracted only 47 entities as relevant entities. The 47 relevant entities are provided to the user. Then, the user may analyse the relevant entities and provide a feedback to the entity extraction system 100. In an embodiment, the user may point out correct entities among the relevant entities provided to the user. For example, let the user point that only 40 entities among the 47 entities provided to the user are relevant entities. Thus, the entity extraction system 100 receives the feedback and stores the feedback in the memory 202. The entity extraction system 100 may learn based on the user feedback. In an embodiment, the user may point entities from the text corpus which were not extracted by the entity extraction system 100. The entity extraction system 100 may receive the feedback from the user and store the feedback in the memory 202. Further, the entity extraction system 100 may analyse the feedback provided by the user for learning based on the feedback.

Figure 3:
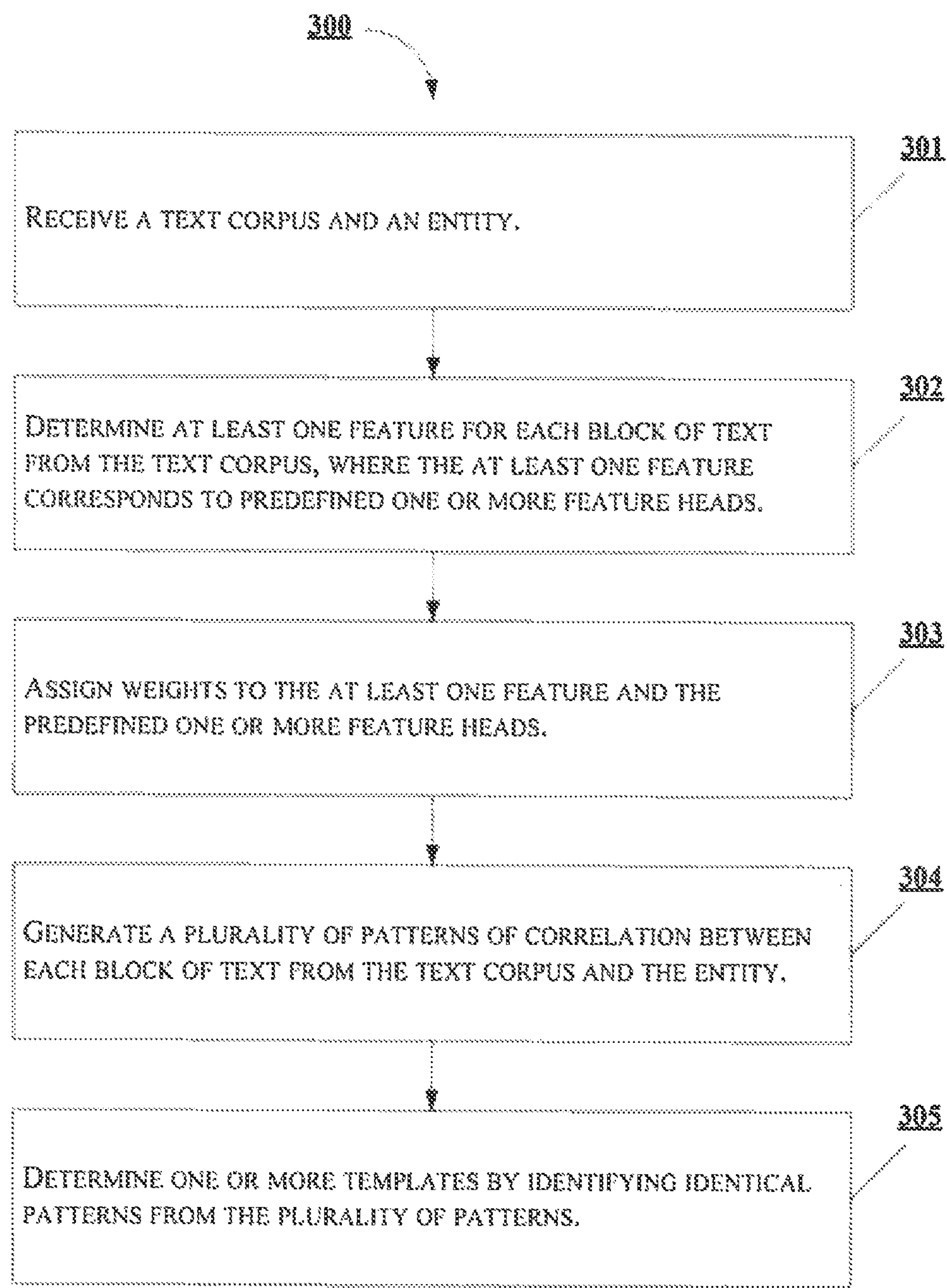
FIG. 3 shows an exemplary flow chart illustrating method steps for training an entity extraction system for extracting relevant entities from a text corpus in accordance with embodiments of the present disclosure.

FIG. 3 shows an exemplary flow chart illustrating method steps for training an entity extraction system for extracting relevant entities from a text corpus in accordance with embodiments of the present disclosure.

As illustrated in FIG. 3, the method 300 may comprise one or more steps for training an entity extraction system for extracting relevant entities from a text corpus in accordance with embodiments of the present disclosure. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step 301, receiving a text corpus and an entity, by the processor 203. Here, the processor 203 of the entity extraction system 100 receives the text corpus and the entity for which relevant entities has to be extracted, from the user device 101. In an embodiment, the entity includes, but is not limited to a domain name, policy name, customer name, vendor name, name of a disease, and name of a medicine. Here, the domain name may include, but is not limited to, industry, restaurant and company.

At step 302, determining at least one feature for each block of text from the text corpus, by the feature determination module 211. The at least one feature corresponds to one or more predefined feature heads. Table 1 shows examples of features and corresponding feature heads:

TABLE 1

| Feature Head | Features |
|---|---|
| Parts of Speech (POS) | Noun, verb, adjective, adverb, preposition |
| Dependency parsing | dobj, nn, nsubj, attr, amod, pobj |
| Semantic role labelling | A0, A1, A2, A3, AM-TMP, AM-LOC |
| Syntax tree | NP, VP, VP-NP, PP |

The at least one feature is determined with reference to Table 1, and each of the at least one feature is mapped to corresponding predefined one or more feature heads. For example, when the feature determination module 211 determines "noun" as a feature for a text, the feature determination module 211 maps the feature "noun" with corresponding feature head "parts of speech". In an embodiment, during training of the entity extraction system 100, the user may train the entity extraction system 100 by identifying the at least one feature and the corresponding predefined one or more feature head. For example, consider a text corpus comprising following text: "Lion is hunting the zebra". Here, the text "Lion" is a noun, the text "is" is a preposition, the text "hunting" is a verb, the text "the" is a demonstrative adjective and the term "Zebra" is a noun. The said features correspond to the feature head POS. Likewise, the entity extraction system 100 identifies features corresponding to the feature heads, dependency parsing, semantic role labelling and syntax tree.

At step 303, assigning weights to the at least one feature and the predefined one or more feature heads, by the score calculator 212. The score calculator 212 assigns weight to the at least one feature. An example of assigning weights to the at least one feature is shown in Table 2:

TABLE 2

| | Parts of speech | | | Dependency Parse | | | Semantic role labelling | | | Syntax Tree | | |
|---|---|---|---|---|---|---|---|---|---|---|---|---|
| Sentence | Noun | Verb | Adjective | Nsubj | Pobj | Amod | A0 | A1 | A2 | NP | VP | PP |
| 1 | 1 | 0 | 0 | 0 | 1 | 1 | 0 | 1 | 0 | 1 | 0 | 0 |
| 2 | 1 | 0 | 0 | 1 | 0 | 1 | 1 | 0 | 0 | 0 | 1 | 0 |
| 3 | 1 | 0 | 0 | 1 | 0 | 0 | 0 | 1 | 0 | 1 | 0 | 0 |
| 4 | 1 | 0 | 0 | 1 | 0 | 0 | 0 | 0 | 1 | 1 | 0 | 0 |

Table 2 shows an example how weights are assigned to the at least one feature. The values may change based on domain and requirements of the user. Here, the weights may be predefined for each of the feature, by the user. In an embodiment, during training of the entity extraction system 100, the user may assign weights to the at least one feature and the predefined one or more feature heads.

Further, the score calculator 212 assigns weight to each of the predefined one or more feature heads. The score calculator 212 may employ custom methods to assign weights to each of the predefined one or more feature heads. Then, the score calculator 212 calculates a score for each block of text from the text corpus using formula given in equation 1 and equation 2:

$$S_0=I*W \quad (1)$$

Where, $S_0$=score of each feature;

I=weight of each feature;

W=weight of each feature head.

$$S_n=\Sigma S_0 \quad (2)$$

Where, $S_n$=score of each block of text.

For example, consider a block of text "Lion is hunting the Zebra". As described in the step 302, the text "Lion" is a noun, the text "is" is a preposition, the text "hunting" is a verb, the text "the" is a demonstrative adjective and the term "Zebra" is a noun. Further, consider that the feature head POS is provided with a weight of 1 unit. Further, let the features noun, verb, adjective and preposition, corresponding to the feature head POS be associated with weights 1, 05, 0.25 and 0.25. Thus, for the example, the text "Lion" has a weight of 1, the text "is" has a weight 0.25, the text "hunting" has a weight of 0.5 and the text "the" has a weight of 0.25 and the text "Zebra" has a weight of 1. Thus, score of each of the text block is given by the equation 1:

$$S(\text{Lion})=1*1=1;$$

$$S(\text{is})=0.25*1=0.25;$$

$$S(\text{hunting})=0.5*1=0.5;$$

$$S(\text{the})=0.25*1=0.25; \text{ and}$$

$$S(\text{Zebra})=1*1=1.$$

The score for the block of text "Lion is hunting the Zebra" is determined using the equation 2:

$$S(\text{Lion is hunting the Zebra})=1+0.25+0.5+0.25+1=3.$$

The above example is with respect to the features of the feature head POS. Likewise, each feature corresponding to the feature heads semantic role labelling, dependence parsing and syntax tree are determined to score the block of text.

At step, 304, generating a plurality of patterns of correlation of between each block of text from the text corpus and the entity, by the pattern generation module 213. The pattern generation module 213 determines relationship of the entity with each block of text from the text corpus using existing pattern generation techniques. In an embodiment, the pattern generation module 213 may employ fuzzy logic to generate pattern of correlation between the entity and each block of text from the text corpus. In an embodiment, during training of the entity extraction system 100, the user may generate the plurality of patterns and provide the plurality of patterns to the entity extraction system 100.

At step 305, determining one or more templates, by the template determination module 214. The one or more templates are determined by identifying identical patterns from the plurality of patterns. Further, the one or more templates are associated with the predefined threshold score. In an embodiment, during training of the entity extraction system 100, the user may identify identical patterns from the plurality of patterns. In an embodiment, the one or more templates may be based on a fuzzy logic.

In an embodiment, a plurality of clusters may be generated based on semantic similarities between the entity and each block of text from the text corpus, such that identical patterns are clustered and semantic similarities. In an embodiment, the semantic similarities may be identified based on at least one of domain specific concept hierarchy, hypernyms, hyponyms and synonyms. Further, a classification model may be built based on the one or more clusters. For example, consider a sentence "ABC is a great company" and a sentence "XYZ is a great movie". Although both the sentences may have similar structure, both the sentences are differentiated semantically. Further, a topic model may be generated based on the classification model. A topic model may be defined by a cluster of text, where each cluster may have a probability of occurrence for a predefined topic. A text corpus may comprise one or more topics.

In an embodiment, during training of the entity extraction system 100, the method steps 301 to 305 may be used as a reference model for extracting relevant entity from a text corpus in real time. In an embodiment, during training, a variety of text is provided to the entity extraction system 100 as input.

Figure 4:
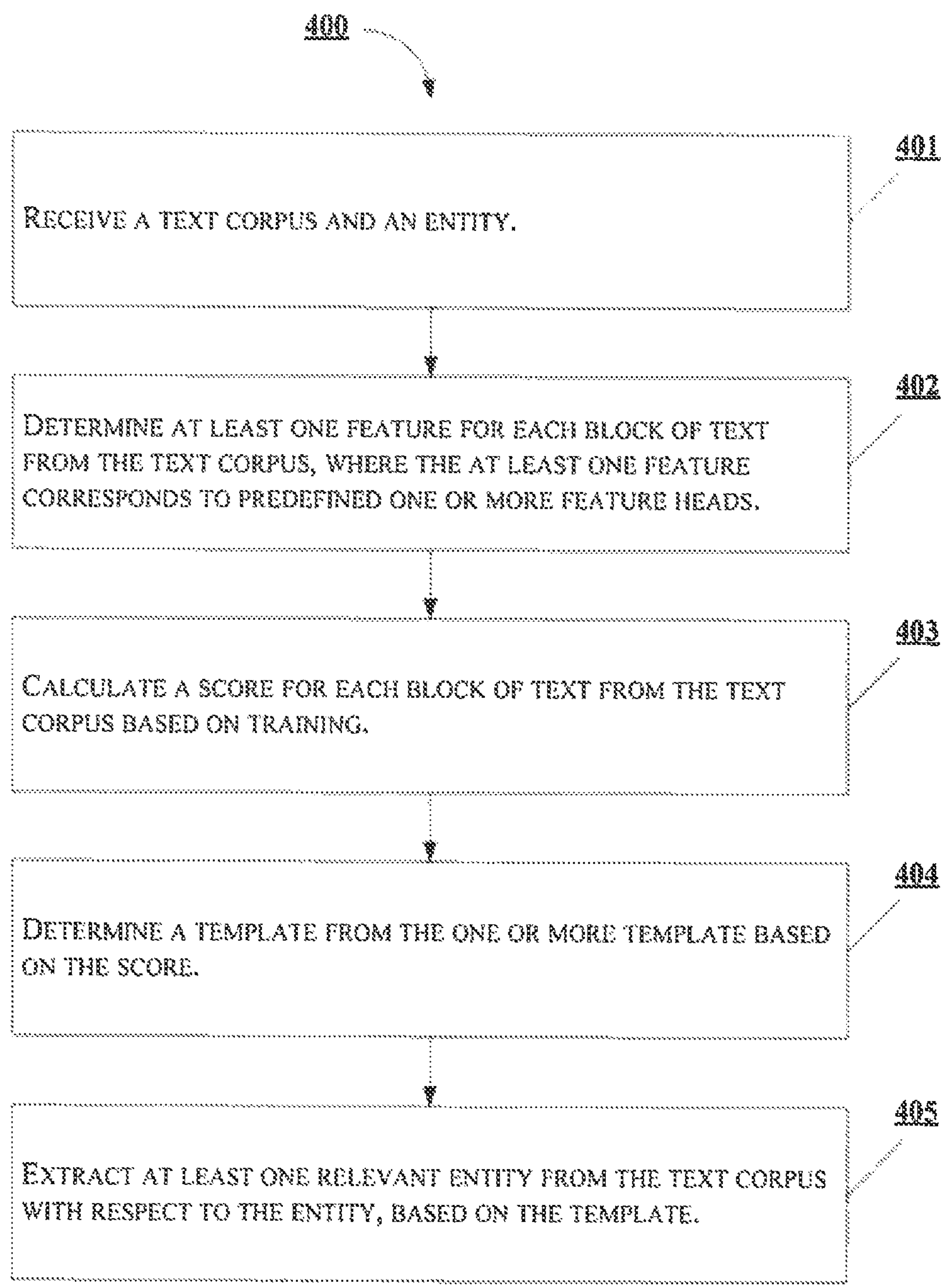
FIG. 4 shows an exemplary flow chart illustrating method steps for extracting relevant entities from a text corpus in real time in accordance with embodiments of the present disclosure.

FIG. 4 shows an exemplary flow chart illustrating method steps for extracting relevant entities from a text corpus in real time in accordance with embodiments of the present disclosure.

As illustrated in FIG. 4, the method 400 may comprise one or more steps for extracting relevant entities from a text corpus in real time in accordance with embodiments of the present disclosure. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

In an embodiment, the method steps 401 to 405 are performed in real time by referring to the training model as defined in the steps 301 to 305.

At step 401, receiving a text corpus and an entity for which relevant text has to be extracted, from the user device 101. Here, the processor 203 of the entity extraction system 100 receives the text corpus and the entity for which relevant entities has to be extracted, from the user device 101. In an embodiment, the entity is a domain name. Here, the domain name may include, but is not limited to industry, restaurant and company. Further, the processor 203 may compare the entity with the one or more clusters by referring to the classification model built during the training of the entity extraction system 100. The comparison is performed to identify whether domain of the entity exists in the training model. The entity extraction system 100 may end the method of 400 when the domain of the entity does not exist in the training model. The entity extraction system 100 may proceed to subsequent method steps when the domain of the entity exists in the training model. For example, consider that the training model has been defined for a domain name "company". When the entity extraction system 100 receives a text corpus and an entity named "restaurant" for which relevant entities has to be extracted, the entity extraction system 100 may end the method.

At step 402, determining at least one feature for each block of text from the text corpus, by the feature determination module 211. The at least one feature corresponds to one or more predefined feature heads.

The at least one feature is determined with reference to Table 1, and each of the at least one feature is mapped to corresponding predefined one or more feature heads. In an embodiment, the entity extraction system 100 creates a feature matrix for the text corpus, for calculating a score for each block of text from the text corpus.

At step 403, calculating a score for each block of text of the text corpus, by the score calculator 212. Here, the score calculator 212 refers to the training model as defined in step 303 to determine weights for each of the text from the text corpus. Further, the score calculator 212 calculates a score for each block of text from the text corpus. In an embodiment, the entity extraction system 100 calculates a score for each row and column of the feature matrix based on weights associated with the at least one feature and corresponding feature heads.

At step 404, determining a template from the plurality of templates, by the template determination module 214. The template determination module 212 refers to the training model as defined in the step 304 and 305 for determining a template from the one or more templates, based on the score calculated for each block of text from the text corpus. For example, consider a text "ABCD" from the text corpus, and let the scores for each character "A", "B", "C" and "D" be 0.5, 046, 0.37 and 0.09 respectively. Let "ABC" be a template as defined by the steps 304 and 305, and let the threshold score for the template be 0.1. Thus, "ABCD" can be considered to fall under the template "ABC" by eliminating the character "D" as the score associated with "D" is less than the threshold score associated with the template "ABC". In an embodiment, the one or more template may be ranked based on the score associated with each block of text associated with the one or more templates. Further, compare score of the block of text with the scores of blocks of text associated with the one or more templates. Determine the template based on the comparison of the score. Further, re-rank the one or more templates based on comparison of the score of the block text with the scores of blocks of text associated with the one or more templates.

At step 405, extracting at least one relevant entity with respect to the entity, by the extraction module 215. The extraction module 215 extracts at least one relevant entity from the text corpus based on the template.

In an embodiment, the steps 401 to 405 may be used for extracting relevant entities in real time. In an embodiment, the method steps 401 to 405 may be used for predicting relevant entities in a subsequent text corpus. For example, consider that a first text corpus and an entity are provided to the entity extraction system 100. Further, when a second text corpus is provided to the entity extraction system 100, the entity extraction system 100 may predict relevant entities in the second text corpus. In an embodiment, when the entity is not provided to the entity extraction system 100, the entity extraction system 100 may consider a predefined name as the entity name and extract relevant entities with respect to the predefined name.

In an embodiment, the entity extraction system 100 may use machine learning techniques. Thus, the entity extraction system 100 may be subjected to learn based on each input and each output of the entity extraction system 100.

In an embodiment, the at least one relevant entity are provided to the user. Further, the entity extraction system 100 receives a feedback for the at least one relevant entity provided. Thus, the entity extraction system 100 may be subjected to learning process based on the feedback received from the user.

In an embodiment, the text corpus and the entity received from the user device 101 may be subjected to conditioning techniques like parsing, pre-processing, resolution enhancement, co-reference resolution, sentence disambiguation, etc.

Computer System

Figure 5:
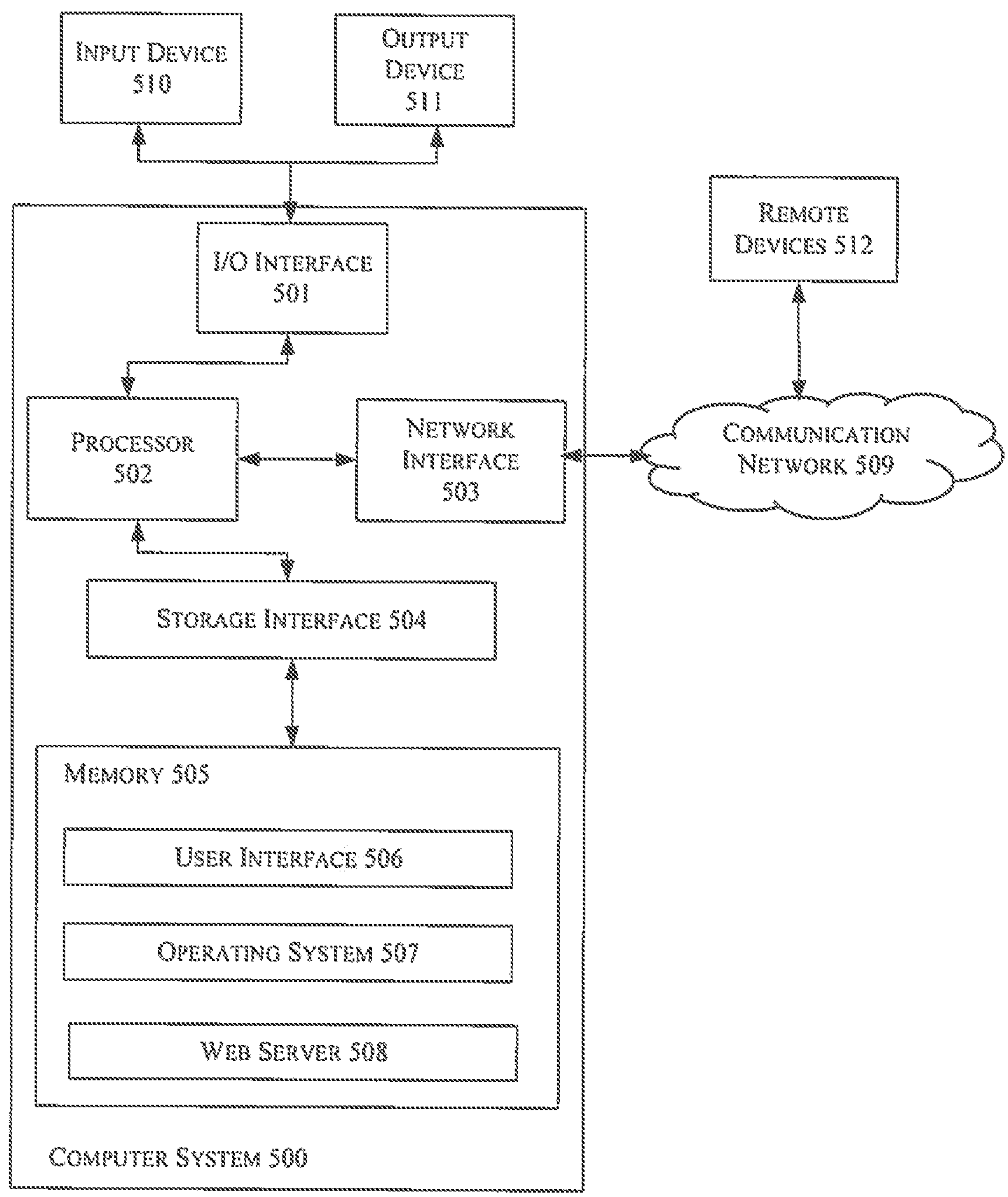
FIG. 5 shows a general-purpose computer system for extracting relevant entities from a text corpus in accordance with embodiments of the present disclosure.

FIG. 5 illustrates a block diagram of an exemplary computer system 500 for implementing embodiments consistent with the present disclosure. In an embodiment, the computer system 500 is used to implement the method for extracting relevant entities from a text corpus. The computer system 500 may comprise a central processing unit ("CPU" or "processor") 502. The processor 502 may comprise at least one data processor for executing program components for dynamic resource allocation at run time. The processor 502 may include specialized processing units such as integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monaural, RCA, stereo, IEEE®-1394, serial bus, universal serial bus (USB), infrared, PS/2, BNC, coaxial, component, composite, digital visual interface (DVI), high-definition multimedia interface (HDMI), RF antennas, S-Video, VGA, IEEE® 802.n/b/g/n/x, Bluetooth®, cellular (e.g., code-division multiple access (CDMA), high-speed packet access (HSPA+), global system for mobile communications (GSM), long-term evolution (LTE™), WiMax®, or the like), etc.

Using the I/O interface 501, the computer system 500 may communicate with one or more I/O devices. For example, the input device 510 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 511 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 is connected to the service operator through a communication network 509. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/Internet protocol (TCP/IP), token ring, IEEE® 802.11a/b/g/n/x, etc. The communication network 509 may include, without limitation, a direct interconnection, e-commerce network, a peer to peer (P2P) network, local area network (LAN), wide area network (WAN), wireless network (e.g., using Wireless Application Protocol), the Internet, Wi-Fi®, etc. Using the network interface 503 and the communication network 509, the computer system 400 may communicate with the one or more service operators.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as serial advanced technology attachment (SATA), Integrated Drive Electronics (IDE), IEEE®-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507, web server 508 etc. In some embodiments, computer system 500 may store user/application data 506, such as the data, variables, records, etc. as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, Apple® Macintosh® OS X, Unix®, Unix®-like system distributions (e.g., Berkeley Software Distribution (BSD), FreeBSD®, NetBSD®, OpenBSD, etc.), Linux distributions (e.g., Red Hat®, Ubuntu®, Kubuntu®, etc.), IBM® OS/2, Microsoft® Windows® (XP, Vista/7/8, 10 etc.), Apple® iOS®, Google® Android®, Blackberry® OS, or the like.

In some embodiments, the computer system 500 may implement a web browser 508 stored program component. The web browser 508 may be a hypertext viewing application, such as Microsoft® Internet® Explorer®, Google® Chrome®, Mozilla® Firefox®, Apple® Safari®, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX, DHTML, Adobe® Flash®, JavaScript®, Java®, Application Programming Interfaces (APIs), etc. In some embodiments, the computer system 500 may implement a mail server stored program component. The mail server may be an Internet mail server such as Microsoft® Exchange®, or the like. The mail server may utilize facilities such as ASP, ActiveX®, ANSI C++/C#, Microsoft® .NET, CGI scripts, Java®, JavaScript®, PERL®, PHP, Python®, WebObjects®, etc. The mail server may utilize communication protocols such as Internet Message Access Protocol (IMAP), Messaging Application Programming Interface (MAPI), Microsoft® Exchange®, Post Office Protocol (POP), Simple Mail Transfer Protocol (SMTP), or the like. In some embodiments, the computer system 500 may implement a mail client stored program component. The mail client may be a mail viewing application, such as Apple® Mail, Microsoft® Entourage®, Microsoft® Outlook®, Mozilla Thunderbird™, etc.

In an embodiment, the computer system 500 may comprise remote devices 512. The computer system 500 may receive the text corpus and the entity from the remote devices 512 through the Communication network 509.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3, FIG. 4, show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

In an embodiment, the present disclosure discloses a method and a device to extract relevant entities for a given entity. Thus, the present method and system reduces usage of custom techniques for extracting relevant entities from unstructured text.

In an embodiment, the present disclosure discloses a system which employs machine learning technique. Thus, the system can be trained for any domain and can be used in real time. Therefore, the present system overcomes the drawback of restriction for a domain specific entity.

In an embodiment, the present disclosure discloses a system and a method for predicting relevant in a text corpus. Thus, the prediction reduces time for extracting the relevant entities.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of extracting relevant entities from a text corpus, comprising:

receiving a text corpus and an entity;

determining at least one feature for each block of text from the text corpus, wherein the at least one feature corresponds to predefined one or more feature heads;

calculating a score for each block of text from the text corpus based on training of an entity extraction computing device, wherein during the training, weights are assigned to the at least one feature and the predefined one or more feature heads, and wherein the weights are assigned based on domain and requirements of a user;

determining a template from one or more templates based on the calculated score, wherein the one or more templates are generated based on the training of the entity extraction computing device, wherein during the training, identical patterns are identified from a plurality of patterns based on a computational linguistic rank comparison indicating correlation between each block of text from the text corpus and the entity, wherein each of the one or more templates is associated with a predefined threshold score, when a character of a text of a pattern is associated with a score less than the predefined threshold score, then the character associated with the lesser score is eliminated, leaving the remaining characters in the pattern to create a new pattern, wherein the new pattern becomes the template when the new pattern has identical patterns when compared with the plurality of patterns; and extracting at least one relevant entity from the text corpus, with respect to the entity, based on the template, wherein the at least one relevant entity extracted depends on the score associated with each block of text present in the one or more templates.

2. The method of claim 1, wherein the entity comprises at least one of a domain name, policy names, a customer name, a vendor name, a name of a disease, and a name of a medicine.

3. The method of claim 1, wherein the predefined one or more feature heads comprise at least one of parts of speech tagging, semantic role labelling, a syntax tree, and dependency parsing.

4. The method of claim 1, wherein the at least one feature comprises at least one of a noun, an adjective, an adverb, a verb, a preposition, a direct object, a noun compound modifier, a nominal subject, an attribute, an adjectival modifier, an object of a preposition, a root, an argument structure, a temporal, a location, a negation, a moral, a noun phrase, a prepositional phrase, an adverb phrase, and an adjective phrase.

5. The method of claim 1, wherein the plurality of patterns is generated during the training of the entity extraction computing device based on the weights of the at least one feature and the predefined one or more feature heads.

6. The method of claim 1, further comprising predicting presence of the at least one relevant entity in a subsequent text corpus.

7. The method of claim 1, further comprising receiving feedback from a user for the at least one relevant entity.

8. An entity extraction computing device comprising: a processor; and a memory, communicatively coupled to the processor, which stores processor-executable instructions, which, on execution, cause the processor to: receive a text corpus and an entity;

determine at least one feature for each block of text from the text corpus, wherein the at least one feature corresponds to predefined one or more feature heads;

calculate a score for each block of text from the text corpus based on training of an entity extraction computing device, wherein during the training, weights are assigned to the at least one feature and the predefined one or more feature heads, and wherein the weights are assigned based on domain and requirements of a user;

determine a template from one or more templates based on the calculated score, wherein the one or more templates are generated based on the training of the entity extraction computing device, wherein during the training, identical patterns are identified from a plurality of patterns based on a computational linguistic rank comparison indicating correlation between each block of text from the text corpus and the entity, wherein each of the one or more templates is associated with a predefined threshold score, when a character of a text of a pattern is associated with a score less than the predefined threshold score, then the character associated with the lesser score is eliminated, leaving the remaining characters create a new pattern, wherein the new pattern becomes the template when the new pattern has identical patterns when compared with the plurality of patterns; and extract at least one relevant entity from the text corpus, with respect to the entity, based on the template, wherein the at least one relevant entity extracted depends on the score associated with each block of text present in the one or more templates.

9. The entity extraction computing device of claim 8, wherein the entity comprises at least one of a domain name, policy names, a customer name, a vendor name, a name of a disease, and a name of a medicine.

10. The entity extraction computing device of claim 8, wherein the predefined one or more feature heads comprise at least one of parts of speech tagging, semantic role labelling, a syntax tree, and dependency parsing.

11. The entity extraction computing device of claim 8, wherein the at least one feature comprises at least one of a noun, an adjective, an adverb, a verb, a preposition, a direct object, a noun compound modifier, a nominal subject, an attribute, an adjectival modifier, an object of a preposition, a root, an argument structure, a temporal, a location, a negation, a moral, a noun phrase, a prepositional phrase, an adverb phrase, and an adjective phrase.

12. The entity extraction computing device of claim 8, wherein the plurality of patterns is generated during the training of the entity extraction computing device based on the weights of the at least one feature and the predefined one or more feature heads.

13. The entity extraction computing device of claim 8, wherein the processor is further configured to predict presence of the at least one relevant entity in a subsequent text corpus.

14. The entity extraction computing device of claim 8, wherein the processor is further configured to receive feedback from a user for the at least one relevant entity.

15. A non-transitory computer readable medium including comprising instructions stored thereon that when processed by at least one processor cause a device to perform operations comprising:

receiving a text corpus and an entity;

determining at least one feature for each block of text from the text corpus, wherein the at least one feature corresponds to predefined one or more feature heads;

calculating a score for each block of text from the text corpus based on training of an entity extraction computing device system, wherein during the training, weights are assigned to the at least one feature and the predefined one or more feature heads during a training phase, and wherein the weights are assigned based on domain and requirements of a user;

determining a template from one or more templates based on the calculated score, wherein the one or more templates are generated based on the training of the entity extraction computing device, wherein during the training, identical patterns are identified from a plurality of patterns based on a computational linguistic rank comparison indicating correlation between each block of text from the text corpus and the entity, wherein each of the one or more templates is associated with a predefined threshold score, when a character of a text of a pattern is associated with a score less than the predefined threshold score, then the character associated with the lesser score is eliminated, leaving the remaining characters in the pattern to create a new pattern, wherein the new pattern becomes the template when the new pattern has identical patterns when compared with the plurality of patterns; and extracting at least one relevant entity from the text corpus, with respect to the entity, based on the template, wherein the at least one relevant entity extracted depends on the score associated with each block of text present in the one or more templates.

16. The medium of claim 15, wherein the entity comprises at least one of a domain name, policy names, a customer name, a vendor name, a name of a disease, and a name of a medicine.

17. The medium of claim 15, wherein the predefined one or more feature heads comprise at least one of parts of speech tagging, semantic role labelling, a syntax tree, and dependency parsing.

18. The medium of claim 15, wherein the at least one feature comprises at least one of a noun, an adjective, an adverb, a verb, a preposition, a direct object, a noun compound modifier, a nominal subject, an attribute, an adjectival modifier, an object of a preposition, a root, an argument structure, a temporal, a location, a negation, a moral, a noun phrase, a prepositional phrase, an adverb phrase, and an adjective phrase.

19. The medium of claim 15, wherein the plurality of patterns is generated during the training of the entity extraction computing device based on the weights of the at least one feature and the predefined one or more feature heads.

20. The medium of claim 15, wherein the stored instructions when processed by the at least one processor cause the device to further perform operations comprising predicting presence of the at least one relevant entity in a subsequent text corpus.

21. The medium of claim 15, wherein the stored instructions when processed by the at least one processor cause the device to further perform operations comprising receiving feedback from the user for the at least one relevant entity.

* * * * *